M. L. SENDERLING.
POWER TRANSMISSION MECHANISM FOR AUTOMOBILES.
APPLICATION FILED OCT. 28, 1912.
1,128,064.
Patented Feb. 9, 1915.
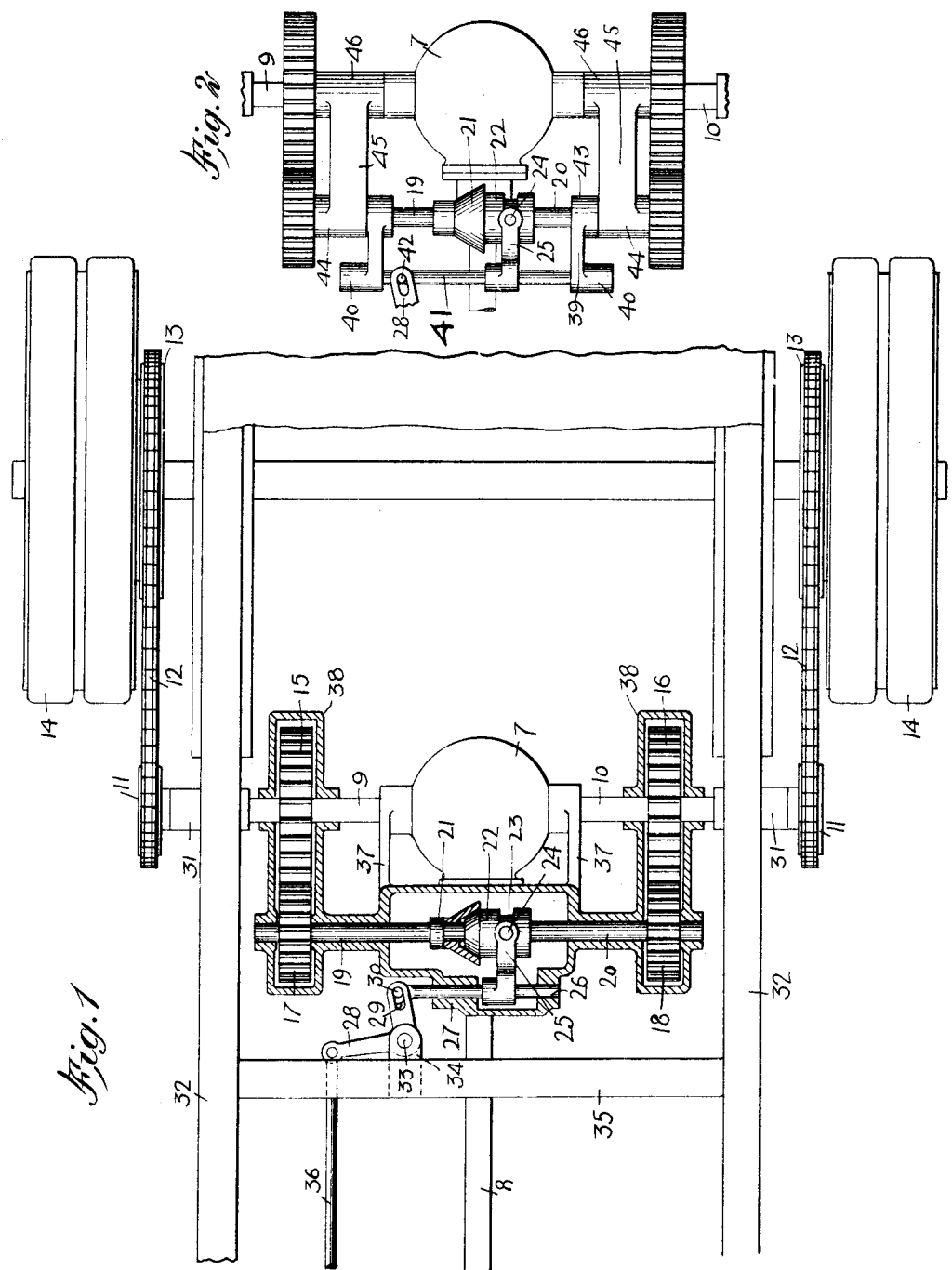
WITNESSES
INVENTOR
MARTIN L. SENDERLING,
BY
ATTORNEYS

# UNITED STATES PATENT OFFICE.

MARTIN L. SENDERLING, OF JERSEY CITY, NEW JERSEY.

POWER-TRANSMISSION MECHANISM FOR AUTOMOBILES.

1,128,064.  Specification of Letters Patent.  Patented Feb. 9, 1915.

Application filed October 28, 1912. Serial No. 728,114.

*To all whom it may concern:*

Be it known that I, MARTIN L. SENDERLING, a citizen of the United States, and a resident of Jersey City, in the county of Hudson and State of New Jersey, have invented a new and Improved Power-Transmission Mechanism for Automobiles, of which the following is a full, clear, and exact description.

Among the principal objects which the present invention has in view are: to provide means manually operable for positively and operatively connecting the two sections of a driving shaft which is normally operatively connected through a differential gearing; and a further object is to simplify the construction of the auxiliary connecting mechanism.

Reference is to be had to the accompanying drawings forming a part of this specification, in which like characters indicate corresponding parts in all the views and in which:

Figure 1 is a plan view, partly in section, of a transmission mechanism constructed and arranged in accordance with the present invention; and Fig. 2 is a view showing a modified form of the invention.

As seen in the drawings, the casing 7 houses any desired form of differential mechanism, by means whereof the power transmitted by the driving shaft 8 is transmitted to either or both of the shaft sections 9 and 10, at the outer ends whereof are sprocket wheels which are operatively connected by belts 12 with sprocket wheels 13 on each of the traction wheels 14 of the automobile.

Under the present existing conditions, if either of the wheels 14 slip, the differential gearing yields to the variable pressure and causes the slipping wheel to race while evading the driving stress of the shaft 8 on the wheel 14 which has gripped. In the present mechanism I provide the gear wheels 15 and 16, the former being rigidly mounted on the shaft section 9, while the latter is rigidly mounted on the shaft section 10. Meshed with the wheels 15 and 16 are gear pinions 17 and 18. The pinion 17 is rigidly mounted on a counter-shaft section 19, while the pinion 18 is rigidly mounted upon a separate counter-shaft section 20. The said countershaft sections are joined in a suitable manner. Rigidly mounted on the section 19 is an internally coned clutch member 21. Slidably mounted on the section 20 is an externally coned clutch member 22. The member 22 is furnished with the usual groove 23 into which is extended the ends of pins 24 mounted in the yoke 25. The yoke 25 is rigidly mounted on a plunger 26. The plunger 26 is slidably mounted in bearings formed in the casing 27.

To shift the plunger 26 and the clutch member 22 carried thereby a bell-crank lever 28 is employed. The bell-crank lever 28 is provided with an elongated slot 29 in which a pin 30 is inserted. The pin 30 is mounted in the end of the plunger 26.

The shaft sections 9 and 10 are each mounted in bearings formed in the casing 7 and in the boxes 31 on the side rails 32 of the automobile chassis. The forward end of the casing 27 is also preferably supported from the chassis. The bell-crank lever 28 is secured by means of a pin 33 in a bracket 34 also mounted on the automobile chassis and on the cross-bar 35 thereof. The bell-crank lever 28 is operated from the driver's or chauffeur's station, being connected with a suitable lever located by means of the connecting rod 36.

Having a mechanism constructed and arranged as above described the operation is as follows: When the driver or chauffeur sees that either of the wheels 14 is slipping on the roadbed when the machine is moving in a substantially straight path, he operates the lever connected with the connecting rod 36 to throw the clutch section 22 into engagement with the clutch section 21. When the clutch sections 21 and 22 grip a transmission is established between the shaft sections 9 and 10 compelling the same to rotate in unison and in effect cutting out the operation of the differential gearing mounted in the casing 7. It will be seen from this that the full power of the shaft 8 and engine connected therewith is imparted to both or one of the wheels 14 and the racing of the idle or slipping wheel is thereby eliminated. When the machine has moved to a section of roadbed where both wheels are operating, normally and performing their function by gripping the roadbed, the driver or chauffeur operates the bell-crank lever 28 and throws out of engagement the clutch members 21 and 22. Thereafter the shaft section 9 and countershaft section 19 and shaft section 10 and countershaft section 20 are free to move independently and as impelled by the differential gearing in the casing 7. It is preferred that the countershaft sections 19 and 20, clutch members thereon, and gear wheels above described should be cased to protect the same from dust and flying grit. For this purpose the casing 27 is provided. It will be noted that the casing 27 is integrally connected with the casing 7, webs of brackets 37 being provided to reinforce the structure. The extensions 38 of the casings are provided to inclose the gear wheels 15 and 17 and 16 and 18.

In the modified form of the invention, as seen in Fig. 2 of the drawings, the casing 27, and associated parts above referred to, is omitted in order that the necessary amount of flexibility or independent adjustment may be permitted the countershaft sections 19 and 20. These sections are connected by brackets 39 with the chassis of the machine. The brackets 39 provide bearing boxes 40 for the plunger 41 with the pin 42 by which the bell-crank lever 28 is engaged. The brackets 39 are each provided with a collar 43 which enfolds the countershaft sections 19 and 20 in juxtaposed relation to the bearings 44 of the heavy links 45. The links 45 are each provided with elongated bearings 46 that extend between the wheels 15 and 16 to the end of bearings of the casing 7.

The operation of the modified form of the mechanism shown in Fig. 2 is in all respects similar to the operation of the preferred form shown in Fig. 1 and above described.

Having thus described my invention, what I claim and desire to secure by Letters Patent is:

1. A power transmission mechanism for automobiles, embodying a sectional driving shaft; a plurality of traction wheels, one operatively connected with each end of said driving shaft; a differential gearing connecting the sections of said driving shaft; a sectional counter-shaft parallel with said driving shaft; a clutch, the separate members whereof are mounted each on one of the sections of said counter-shaft to operatively unite the same when said clutch members are engaged; a plurality of transmission gear wheels fixedly mounted on said driving shaft and said counter-shaft in paired relation, the pairs being disposed at opposite sides of said differential gearing; and manually-operative means for operating said clutch.

2. A power transmission mechanism for automobiles, embodying a sectional driving shaft; a plurality of traction wheels, one operatively connected with each end of said driving shaft; a differential gearing connecting the sections of said driving shaft; a sectional counter-shaft parallel with said driving shaft; a clutch; the separate members whereof are mounted each on one of the sections of said counter-shaft to operatively unite the same when said clutch members are engaged; a plurality of transmission gear wheels fixedly mounted on said driving shaft and said counter-shaft in paired relation, the pairs being disposed at opposite sides of said differential gearing; manually-operative means for operating said clutch; and a unit casing for covering said clutch and differential gearing.

3. A power transmission mechanism for automobiles, embodying a sectional driving shaft; a plurality of traction wheels, one operatively connected with each end of said driving shaft; a differential gearing connecting the sections of said driving shaft; a sectional counter-shaft parallel with said driving shaft; a clutch, the separate members whereof are mounted each on one of the sections of said counter-shaft to operatively unite the same when said clutch members are engaged; a plurality of transmission gear wheels fixedly mounted on said driving shaft and said counter-shaft in paired relation, the pairs being disposed at opposite sides of said differential gearing; manually-operative means for operating said clutch; and a unit casing covering said differential gearing, clutch and transmission gear wheels, said casing having pivotal bearings on said driving shaft, and forming bearings for said counter-shaft.

In testimony whereof I have signed my name to this specification in the presence of two subscribing witnesses.

MARTIN L. SENDERLING

Witnesses:
E. F. MURDOCK,
PHILIP D. ROLLHAUS.